United States Patent

Kobayashi et al.

(10) Patent No.: US 9,120,185 B2
(45) Date of Patent: Sep. 1, 2015

(54) WORKPIECE SUPPORT APPARATUS

(71) Applicant: HONDA MOTOR CO., LTD., Tokyo (JP)

(72) Inventors: Takuo Kobayashi, Tochigi (JP); Izuru Hori, Tochigi (JP); Kenichi Fukami, Tochigi (JP); Masahiro Koike, Tochigi (JP); Shin Yoshida, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 415 days.

(21) Appl. No.: 13/737,342

(22) Filed: Jan. 9, 2013

(65) Prior Publication Data

US 2013/0175750 A1 Jul. 11, 2013

(30) Foreign Application Priority Data

Jan. 10, 2012 (JP) ................................. 2012-002620

(51) Int. Cl.
*B23K 37/04* (2006.01)

(52) U.S. Cl.
CPC ............. *B23K 37/04* (2013.01); *B23K 37/0408* (2013.01)

(58) Field of Classification Search
CPC . B23K 26/0838; B23K 37/04; B23K 37/0408
See application file for complete search history.

(56) References Cited

U.S. PATENT DOCUMENTS

| | | | |
|---|---|---|---|
| 2,729,040 A * | 1/1956 | Wallace et al. | 451/388 |
| 3,032,170 A * | 5/1962 | Elkington | 198/838 |
| 4,200,272 A * | 4/1980 | Godding | 269/26 |
| 7,584,947 B2 * | 9/2009 | Freeland | 269/296 |
| 7,866,642 B2 * | 1/2011 | McAllister | 269/37 |
| 8,253,064 B2 | 8/2012 | Beck et al. | |
| 8,469,345 B2 * | 6/2013 | Samac et al. | 269/266 |
| 2012/0055762 A1 * | 3/2012 | Kobayashi et al. | 198/699.1 |

FOREIGN PATENT DOCUMENTS

| | | |
|---|---|---|
| CN | 102105256 | 6/2011 |
| GB | 2154529 | 9/1985 |
| JP | 62-77688 | 5/1987 |
| JP | S6397389 | 4/1988 |
| JP | H08174258 | 7/1996 |
| JP | 2686661 | 12/1997 |

OTHER PUBLICATIONS

Chinese Office Action issued Aug. 26, 2014, 5 pages.

* cited by examiner

*Primary Examiner* — Lee D Wilson
*Assistant Examiner* — Tyrone V Hall, Jr.
(74) *Attorney, Agent, or Firm* — Rankin, Hill & Clark LLP

(57) ABSTRACT

A workpiece support apparatus is provided with a plurality of support members. The support members support a workpiece. Each support member moves along a moving path to a machining position while the support member is held at a first holding position for supporting the workpiece or a second holding position which is spaced apart from the first holding position. At least one support member is displaced from the first holding position to the second holding position or from the second holding position to the first holding position along a machining trajectory, before the support member arrives at the machining position whenever each support member is moved to the machining position.

3 Claims, 6 Drawing Sheets

WORKPIECE SUPPORT APPARATUS

BACKGROUND OF THE INVENTION

1. Field of the Invention

The invention relates to a workpiece support apparatus.

2. Related Art

In general, when a plate-shaped workpiece is cut by a laser machining apparatus, a machined portion of the workpiece is irradiated by a laser beam from a nozzle of a machining head, while assistant gas is sprayed from the nozzle. In this instance, a material of the machined portion is melted or evaporated by the laser beam, and is removed by the assistant gas. For this reason, the workpiece to be machined is supported by, for example, a pin support type of a workpiece support apparatus so that a member for supporting the workpiece is not irradiated by the laser beam.

As the workpiece support apparatus, for example, a workpiece receiving table is disclosed in Patent Document 1 (JP-U-62-077688), in which the workpiece to be cut by the laser beam is supported by a plurality of support pins arranged in a matrix pattern. The workpiece receiving table includes an electromagnet that selectively attracts and pulls down the respective support pins arranged to be urged in an upward direction at a machining position of the workpiece.

According to the workpiece receiving table of Patent Document 1, when the workpiece is cut by the laser beam, if the support pin exists on or near a cut line of the workpiece, the support pin is attracted and moved downward by the electromagnet. In this way, the support pin is prevented from being melted by the laser beam.

However, according to the workpiece receiving table disclosed in Patent Document 1, since the electromagnet attracting the support pin is provided at the machining position of the workpiece, the selective pull-down of the support pin is only possible after introduction of the workpiece to the machining position is completed. For this reason, a cycle time required to cut the workpiece includes a time required for the selective pull-down of the support pin which is carried out after the introduction of the workpiece to the machining position is completed, and thus the cycle time is extended to that extent.

SUMMARY OF THE INVENTION

According to embodiments, a workpiece support apparatus, in which a cycle time required for cut machining of a workpiece, is provided.

DETAILED DESCRIPTION OF THE EMBODIMENTS

Figure 1:
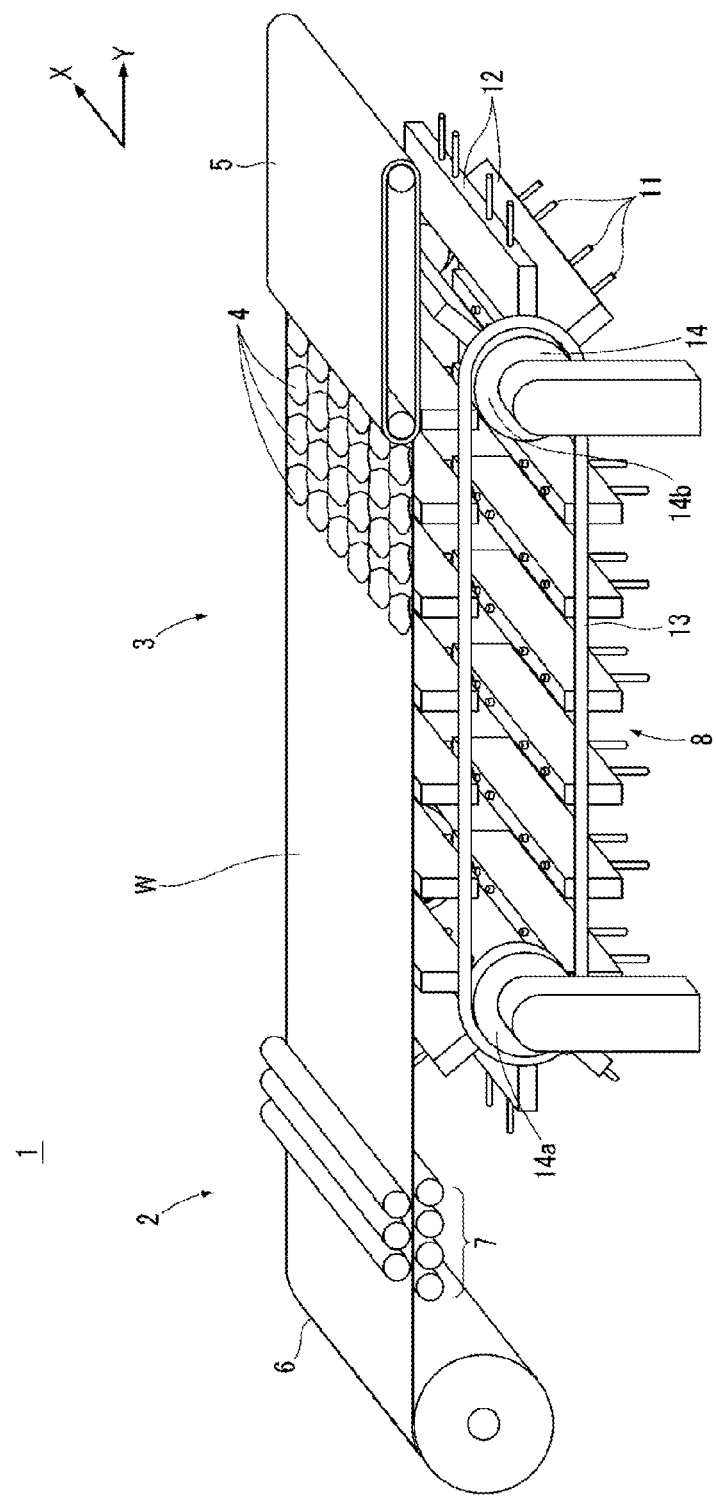
FIG. 1 is a perspective view schematically illustrating a laser machining apparatus according to an embodiment.

Embodiments will now be described with reference to the accompanying drawings. As illustrated in FIG. 1, a laser machining apparatus 1 according to an embodiment includes a workpiece supply section 2 for supplying a workpiece W, a workpiece machining section 3 for cutting the workpiece W supplied from the workpiece supply section 2, and a magnet conveyer 5 for transporting a blank 4 cut from the workpiece W by the workpiece machining section 3 to a next process.

The workpiece supply section 2 includes a coil material drum 6 wound with a steel strip as a coil material, and a leveler 7 configured to correct distortion of the coil material by passing the coil material 6 of the coil material drum 6 between rollers. The supply of the workpiece W to the workpiece machining section 3 is performed by unwinding the coil material of the coil material drum 6, removing the distortion, such as curl, by means of the leveler 7, and sending it to the workpiece machining section 3 as the workpiece W.

The workpiece machining section 3 includes a conveyor type workpiece support apparatus 8 for supporting and transporting the workpiece W supplied from the workpiece supply section 2, a machining head for cutting the workpiece W supported on the workpiece support apparatus 8, and an XY stage for moving the machining head in an X-direction which is an width direction of the workpiece W and a Y-direction which is a longitudinal direction. The machining head and the XY stage are not illustrated herein.

The workpiece support apparatus 8 includes a plurality of support members 11 for supporting the workpiece W from a bottom surface, a plurality of holders 12 for holding the support members 11 by a predetermined number, two conveyor belts 13 turned while holding the respective holders 12, and two pair of pulleys 14 for driving the conveyor belts 13 respectively. A transfer unit 100 consists of the holders 12, the conveyor belts 13, the pair of pulleys 14, and so forth.

Each pair of pulleys 14 consists of a pulley 14a at an upstream side of a transfer direction and a pulley 14b at a downstream side. Each pair of pulleys 14 are disposed on a horizontal surface so that a raceway surface of a revolving path of the respective conveyor belts 13 is placed to be opposite to each other at an interval having an approximate width of the workpiece W in the direction X. The holder 12 and the support member 11 are moved along the respective revolving paths revolving in synchronization with the revolving path of the conveyor belt 13.

The revolving path includes an upper linear raceway portion corresponding to a linear portion between upper end portions of the pulleys 14a and 14b, a lower linear raceway portion corresponding to a linear portion between lower end portions of the pulleys 14a and 14b, an upstream semicircular raceway portion corresponding to a semicircular portion at the upstream side of the transfer direction of the workpiece W for the pulley 14a, and a downstream semicircular raceway portion corresponding to a semicircular portion at the downstream side of the transfer direction of the workpiece W for the pulley 14b.

Each holder 12 has an appearance of a rectangular solid shape having a length ranged over the respective conveyor belts 13, and both end faces of the holder 12 in a longitudinal direction are fixed to the respective conveyor belts 13. This fixation is carried out such that the respective holders 12 is arranged in parallel to each other in the direction X at an equal interval and the long side of each holder 12 in the longitudinal direction is perpendicular to the revolving path of the holder 12.

The holding of the support member 11 by the respective holders 12 is carried out such that a front end of the support member 11 is orientated to the outside of the revolving path of the support member 11. Also, the respective support member 11 is disposed at a predetermined interval with respect to the corresponding holder 12. Accordingly, the support members 11 are disposed in a matrix pattern along a row direction along the revolving path and a column direction perpendicular to the raceway surface of the revolving path.

When each support member 11 moves along the upper linear raceway portion of the revolving path, the support member passes through a desired machining position, while supporting the workpiece W. The machining position corresponds to a range in which the machining head is movable by the above-described XY stage. At the machining position, while the machining head is moved by the XY stage along the machining trajectory, the workpiece W is irradiated by the laser beam and the assistant gas from the machining head, so that the workpiece W is cut.

Figure 2A:
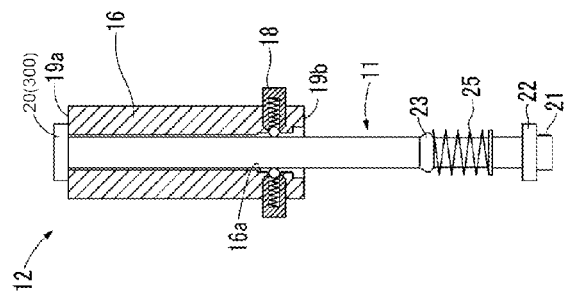
FIGS. 2(a) to 2(c) are horizontal cross-sectional views of a holder for the laser machining apparatus in FIG. 1.
Figure 2B:
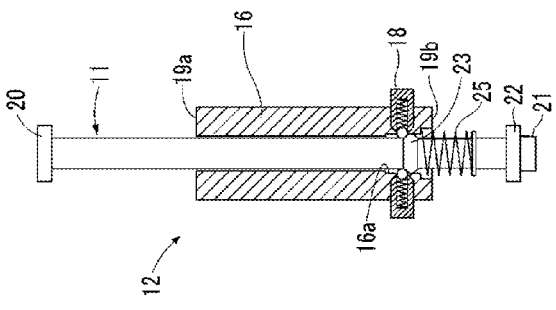
Figure 2C:
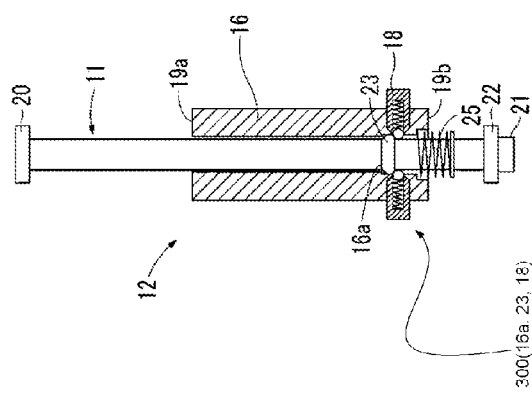

FIGS. 2(a) to 2(c) is a horizontal cross-sectional view illustrating the portion for supporting the support member 11 of the holder 12. A top portion of FIGS. 2(a) to 2(c) corresponds to the outside of the revolving path of the support member 11 and the holder 12. As illustrated in FIGS. 2(a) to 2(c), the holder 12 has a holding portion 16 for holding the support member 11, and a ball plunger 18 for fixing the support member 11 at a desired position.

The holder 12 is moved by the conveyor belt 13 so that an outer lateral surface 19a which is one lateral surface in parallel with the longitudinal direction (direction X) thereof is always oriented to the outside of the revolving path of the holder 12. The support member 11 is formed in an almost columnar shape which is longer than the distance from the outer lateral surface 19a of the holder 12 to an inner lateral surface 19b opposite to the outer surface.

The holding portion 16 holds the support member 11 in such a way that the front end of the support member 11 is oriented to the outside of the revolving path of the support member 11 and the support member 11 is movable in a direction perpendicular to the revolving path.

The front end of the support member 11 is provided with a flange-shaped support portion 20 which is in contact with a rear surface of the workpiece W when the support member 11 supports the workpiece W. When the support member 11 is moved downward in the holding portion 16 by its weight, the support portion 20 has a function of stopping the downward movement.

A distal end of the support member 11 is provided with a ball roller 21 protruding from its distal end face, and a flange-shaped flange portion 22 adjacent to a side opposite to a roller surface of the ball roller 21. The support member 11 is provided with a diameter-increased portion 23 having an increased diameter at a slightly front end side rather than the flange portion 22.

The holding portion 16 is provided with a cylindrical large-diameter portion 16a having a diameter larger than that of its upper portion at a portion adjacent to the lower end of the holding portion. The large-diameter portion 16a is formed so that the diameter increased portion 23 can access to the large-diameter portion 16a from the inner lateral surface 19b along with the movement of the support member 11. The ball plunger 18 is configured to act on the diameter-increased portion 23 accessing to the large-diameter portion 16a, from the inner wall side of the large-diameter portion 16a. The large-diameter portion 16a, the ball plunger 18, and the diameter increased portion 23 function as a fixing unit 300 for fixing the support member 11 at the position where the workpiece W is supported.

The diameter-increased portion 23 is provided with a coil spring 25 at a portion adjacent to the flange portion 22, and the flange portion 22 is fixed to the support member 11.

Each support member 11 is held by the holder 12 in each state illustrated in FIGS. 2(a) to 2(c). In FIG. 2(a), there is illustrated a lock state in which the ball plunger 18 holds the diameter-increased portion 23 at the upper end portion of the large-diameter portion 16a to fix the support member 11 at a first holding position. In this state, the coil spring 25 is pressed by the end portion of the holding portion 16, so that the support member 11 is urged in the direction to the proximal end thereof.

When the support member 11 is positioned at the first holding position, the front end of the support member 11 protrudes from the outer surface 19a of the holder 12 to the max. In this state, when the support member 11 is moved along the upper linear raceway portion of the revolving path, the support member 11 passes through the machining position while supporting the workpiece W.

In FIG. 2(b), there is illustrated a state in which the support member 11 is supported by the ball plunger 18 at the support portion 20 of the diameter-increased portion 23. This state occurs when the lock state of the support member 11 in FIG. 2(a) is released by the movement of the support member 11 in the direction to the proximal end thereof while the support member 11 is moved along the lower linear raceway portion of the revolving path.

In FIG. 2(c), there is illustrated a state in which the support member 11 is fixed at a second holding position above the holder 12. This state occurs when the support member 11, which is released from the lock state, as illustrated in FIG. 2(b), arrives at the upper portion of the upstream semicircular raceway portion of the revolving path, and then is moved downward by its weight until the support portion 20 is in contact with the holding portion 16. In this state, the support portion 20 of the support member 11 and its weight function as the fixing unit 300 for fixing the support member 11 at the second holding position.

The second holding position is a position in which the workpiece W is not supported when the support member 11 passes through the machining position. The position is not adversely affected even though the support position corresponding to the workpiece W is irradiated by the laser beam.

Figure 3:
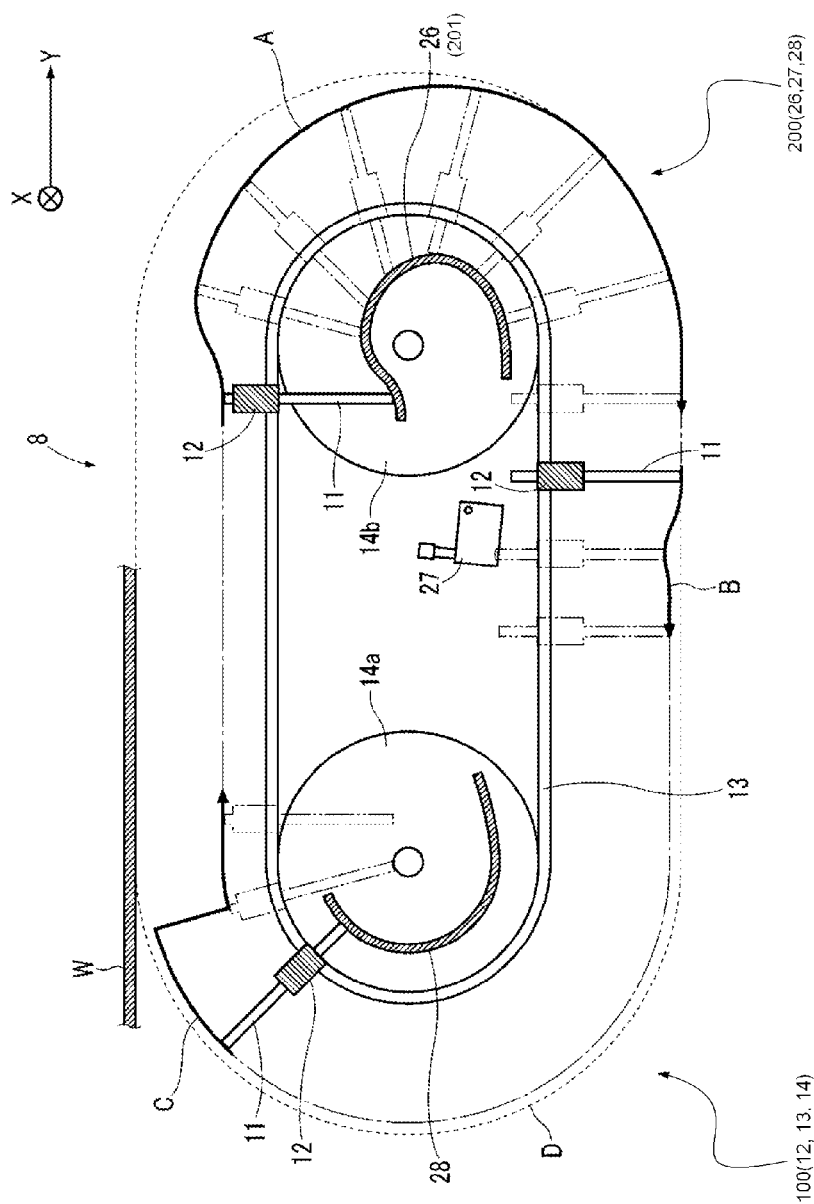
FIG. 3 is a diagram illustrating a moving manner of a support member in a workpiece support apparatus of the laser machining apparatus in FIG. 1.

FIG. 3 is a diagram illustrating a moving manner of the support member in the workpiece support apparatus 8. The workpiece support apparatus 8 includes a slope member provided near the downstream semicircular raceway portion of the revolving path of the holder 12, a lock release mechanism 27 provided near the lower linear raceway portion of the revolving path, and a movement restricting member 28 provided near the upstream semicircular raceway portion of the revolving path.

The slope member 28 and the movement restricting member 28 are provided in common for every column of the support members 11. The lock release mechanism 27 is provided for every row of the support members 11. The slope member 26 has a slope surface inclined with respect to the moving path of the support member 11. The slope surface is formed so that a distance from the slope member to the inner lateral surface 19b (see FIG. 2(a)) of the holder 12 is the longest at a start end portion of the upstream side in the moving path of the support member 11, and is the shortest at a distal end.

The slope surface of the slope member 26 applies a component of force to the support member 11 in the position of the first holding position when the support member 11 which is positioned at the second holding position, like the state illustrated in FIG. 2(c), is moved while the ball roller 21 is in contact with the slope surface. As a result, the coil spring 25 is compressed, thereby setting the lock state in FIG. 2(a). In this instance, the front end of the support member 11 is moved along a moving path A. In FIG. 3, the shape of the support member at each time is indicated by a two-dash line, with its front end moving along the moving path A.

When the support member 11, which should be positioned at the second holding position when passing through the next machining position, passes through the lock release mechanism 27, the lock release mechanism 27 releases the lock state to make the state illustrated in FIG. 2(b). Before and after the release is performed, the front end of the support member 11 is moved along a moving path B, as illustrated in FIG. 3.

The movement restricting member 28 is provided within the range from the start end portion of the upstream semicircular raceway portion to a portion adjacent to the distal end in the revolving path of the support member 11. In order to prevent the proximal end of the support member 11 in the state, in which the lock state is released, illustrated in FIG. 2(b), from interfering with other component of the workpiece support apparatus 8, the movement restricting member 28 interrupts the movement of the support member 11, and also restricts a timing when the support member 11 is to be in the state illustrated in FIG. 2(c).

That is, the support member 11 which is released from the lock state is moved while making the ball roller 21 (see FIG. 2(a)) into contact with the outer surface of the movement restricting member 28. When the support member 11 arrives at the upper end portion of the movement restricting member 28, the support member is moved downward by its weight, and then is positioned at the second holding position. Before and after the movement by the weight, the front end of the support member 11 is moved along a moving path C, as illustrated in FIG. 3.

The front end of the support member 11 passing through the lock release mechanism 27 is moved along a moving path D, with the support member 11 being not released from the lock state by the lock release mechanism 27, and then is returned to the lock release mechanism 27. In this instance, while the support member 11 is moved along the upper linear raceway portion of the revolving path, the support member supports the workpiece W using the support portion 20 (see FIG. 2(a)) provided on the front end thereof, and passes through the machining position.

Figure 4A:
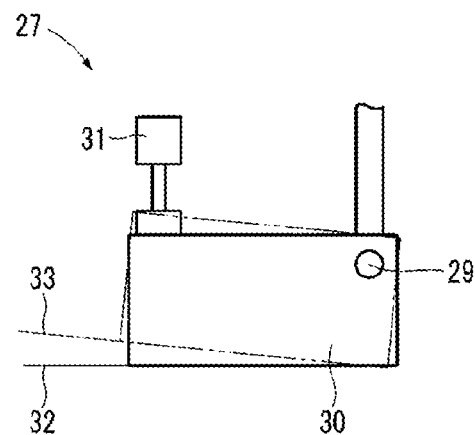
FIGS. 4(a) and 4(b) are front and right side views of a lock release mechanism of the laser machining apparatus in FIG. 1.
Figure 4B:
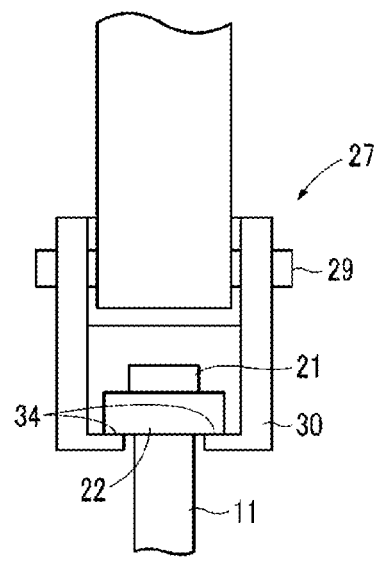

FIGS. 4(a) and 4(b) are front and right side views of major parts of the lock release mechanism 27, respectively. As illustrated in FIGS. 4(a) and 4(b), the lock release mechanism 27 includes a support shaft 29 fixed to the workpiece support apparatus 8 (see FIG. 1), a swing member 30 swingably attached to the vicinity of the support shaft 29, and a motor 31 functioning as a drive source to swing the swing member 30 around the support shaft 29.

A center axis of the support shaft 29 is vertical to the raceway surface of the revolving path of the support member 11. The support shaft 29 is positioned on the distal end of the support member 11 at the upstream side of the moving direction. The point, in which the motor 31 applies the force to swing the swing member 30, is that the motor is positioned at the end portion of the swing member 30 opposite to the support shaft 29. The motor 31 controls the swing of the swing member 30 so that the swing member swings between a first swing position 32 and a second swing position 33.

The swing member 30 has a swing surface 34 extending from the end portion of the support member 11 at the upstream side of the moving direction to the end portion thereof at the downstream side. The swing surface 34 is maintained in a horizontal posture when the swing member 30 is positioned at the first swing position 32, and is in parallel with the moving direction of the support member 11. Also, when the swing member is positioned at the second swing position 33, the swing surface is positioned at a predetermined angle to the moving direction of the support member 11.

Figure 5A:
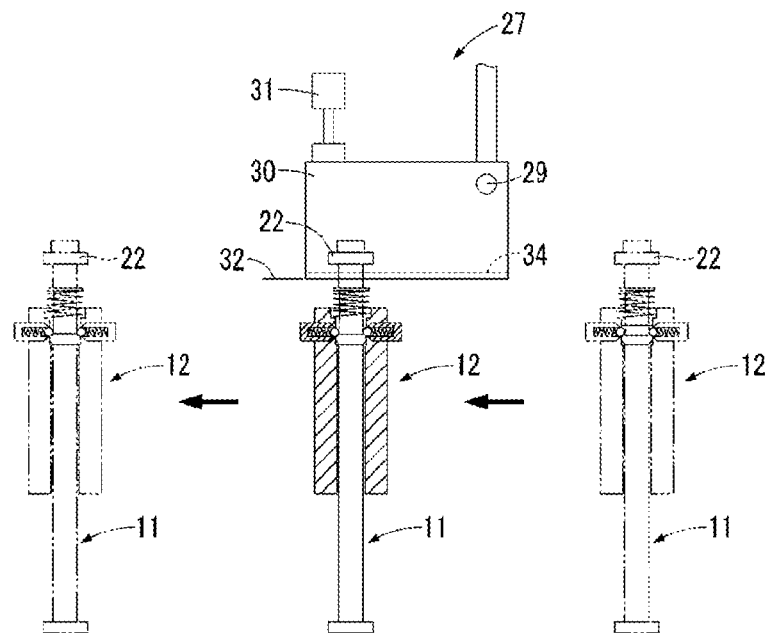
FIGS. 5(a) and 5(b) are diagrams illustrating a function of the lock release mechanism in FIG. 4.
Figure 5B:
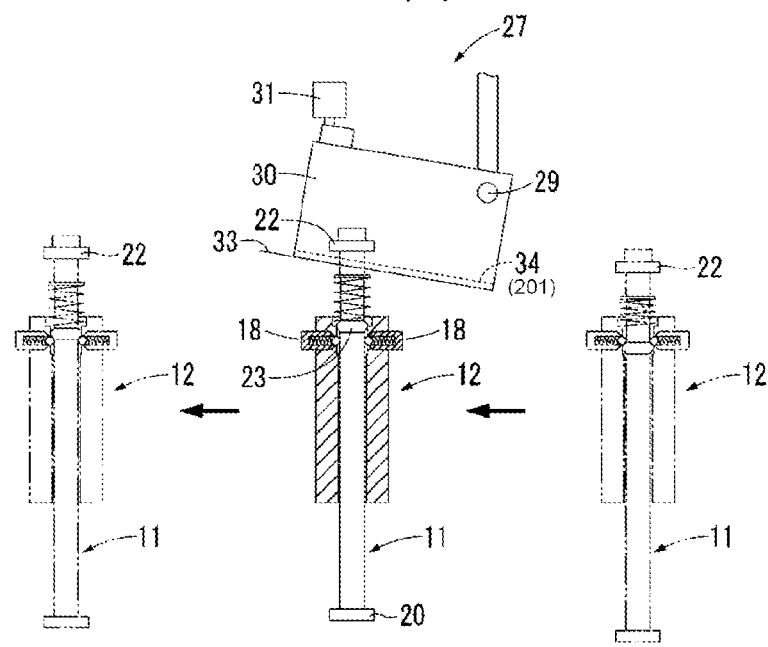

FIGS. 5(a) and 5(b) illustrates the function of the lock release mechanism 27. If the support member 11 passes in the lock state illustrated in FIG. 2(a) when the support member 11 passes through the corresponding lock release mechanism 27, the swing position of the swing member 30 of the unlock member 27 is maintained at the first swing position 32, as illustrated in FIG. 5(a). In this instance, since the swing surface 34 of the swing member 30 is maintained in parallel with the moving path of the support member 11, the support member 11 passes without being brought into contact with the flange portion 22 of the support member 11.

In the case where the lock state is released, as illustrated in FIG. 5(b), when the flange portion 22 of the support member 11 arrives at a given position on the swing surface 34, the swing member 30 is swung to the second swing position by the motor 31, and then is returned to the first swing position 32. In this way, the swing surface 34 applies a component of the force to the flange portion 22 to displace the support member to the second holding position, and pulls the support member 11 upward.

In this instance, the ball plunger 18 of the holder 12 crosses the diameter-increased portion 23 against the pressing force of the spring, and then moves toward the support portion 20 of the diameter-increased portion 23. In this way, the support member 11 is released from the lock state, and is in the state illustrated in FIG. 2(b).

Since the swing surface 34 has a certain length along the moving direction of the support member 11, the swing surface can pull the flange portion upward while consuming a certain time, in even case where the moving speed of the support member 11 is fast. Also, since the swing surface 34 is inclined at a certain angle to the moving direction of the support member 11, the swing surface does not interfere with the support member 11, in even case where the timing of swinging to the second swing position 33 does not coincide to some extents.

When the lock state is carried out by the above-described slope member 26 and the lock state is released by the lock release mechanism 27, the large-diameter portion 16a, the ball plunger 18, and the diameter-increased portion 23 function as the fixing unit for fixing the support member 11 at the first holding position, while allowing the support member to displace to the first holding position and displace from the first holding position in accordance with the force applied to the support member 11 and the direction thereof.

With the above configuration, when the workpiece W is cut, each support member 11 is revolved in a matrix pattern along the revolving path. In this instance, when each support member 11 is moved along the upper linear raceway portion of the revolving path, the support member passes through the machining position while supporting the workpiece W. However, when each support member 11 passes through the machining position, the support member 11 may be adversely affected, for example, melting, if the support member 11 supporting the workpiece W is irradiated by the laser beam.

For this reason, it is necessary to set the holding position of the respective support member 11 in the holder 12 as the first holding position when the machining trajectory does not pass through the position within a predetermined range from the support position of the workpiece W to be subsequently supported by the support member 11, but to set the holding position as the second holding position when it passes. Whenever each support member 11 passes through the machining position, the holding position of the support member 11 is properly switched between the first holding position and the second holding position in the holder 12 in accordance with the machining trajectory, before the support member 11 arrives at the machining position.

That is, the support member 11 passed through the machining position first passes above the slope member 26. At that time, when the support member 11 is in the lock state illustrated in FIG. 2(*a*), and is positioned at the first holding position, the support member passes above the slope member 26 as it is.

Meanwhile, when the support member 11 is in the lock state illustrated in FIG. 2(*c*), and is positioned at the second holding position, the support member is displaced to the first holding position by the slope member 26, and thus is in the lock state illustrated in FIG. 2(*a*). Accordingly, all support members 11 passed through the slope member 26 are uniformly in the lock state.

Then, the support member 11 passed above the slope member 26 passes through the lock release mechanism 27, and is released from the lock state, if necessary. That is, if it is determined on the basis of the machining trajectory that the support member 11 should be positioned at the first holding position, when passing the next machining position, the position of the swing member 30 of the lock release mechanism 27 is maintained at the first swing position, when the support member 11 passes through the corresponding lock release mechanism 27.

In this way, the support member 11 passes through the lock release mechanism 27, as illustrated in FIG. 5(*a*), with the lock state being not released. Accordingly, the support member 11 is in the state which is held at the first holding position, as illustrated in FIG. 2(*a*), even after passing through the lock release mechanism 27.

If it is determined on the basis of the machining trajectory that the support member 11 is positioned at the second holding position when passing through the next machining position, the swing member 30 of the lock release mechanism 27 is swung to the second swing position when the support member 11 passes through the lock release mechanism 27 corresponding to the support member 11. In this way, the support member 11 is released from the lock state, and the state illustrated in FIG. 2(*b*) is achieved in which the end portion of the diameter-increased portion 23 is supported by the ball plunger 18.

The support member 11 passed through the lock release mechanism 27 then passes above the movement restricting member 28. When the support member 11 crosses over the upper end portion of the movement restricting member 28, if the support member 11 is in the state illustrated in FIG. 2(*a*) in which the lock state is not released, the support member passes through the machining position, while supporting the workpiece W along the upper linear raceway portion of the revolving path in the state in which it is positioned at the first holding position as it is. In this instance, since the machining trajectory does not pass through the position within the predetermined range from the position of the workpiece W supported by the support member 11, it does not adversely affected by irradiation of the laser beam.

If the support member 11 passed through the lock release mechanism 27 is released from the lock state, the support member 11 is slightly moved in the direction to the proximal end by its weight, at that time in which the support member 11 arrives at the upper end portion of the movement restricting member 28 when the support member passes through the movement restricting member 28.

That is, the state, in which the end portion of the diameter-increased portion 23 is supported by the ball plunger 18, illustrated in FIG. 2(*b*) is shifted to the state, in which the proximal end of the support member 11 is supported by the movement restricting member 28. Accordingly, when the support member 11 passes through the movement restricting member 28, the support member 11 is not further supported by the movement restricting member 28, and then is moved to the second holding position by its weight, so that the state illustrated in FIG. 2(*c*) is achieved.

In this instance, the support member 11 passes through the machining positing, without supporting the workpiece W, while the support member is positioned at the second holding position. Accordingly, when the support member 11 passes through the machining position, even though the portion of the workpiece W immediately on the support member 11 is irradiated by the laser beam, the front end of the support member 11 is spaced apart from a focal position of the laser beam by a predetermined distance. Therefore, the support member 11 is not adversely affected by the laser beam.

In order to avoid the support member 11, which has passed through the machining position, from being adversely affected by the laser beam through the same process, the holding position in the holder 12 is switched on the basis of the machining trajectory, if necessary.

As described above, according to this embodiment, the switching of the holding position in the holder 12, which is carried out whenever each support member 11 is moved to the machining position, is performed by moving each support member 11 before each support member 11 arrives at the machining position. Therefore, since it is not necessary to stop the transfer of the workpiece W at the machining position and then perform the switching of the holding position, as the related art, it is possible to shorten a cycle time required for machining the workpiece W.

Also, a displacement unit 200 for displacing the support member 11 to the first holding position or the second holding position to perform the switching of the holding position consists of the slope member 26, the lock release mechanism 27, and the movement restricting member 28. For this reason, the position of the support member 11 can be displaced to the first holding position or the second holding position by the weight of the support member 11 or the force of the support member moved by the workpiece support apparatus 8. Therefore, a power source required for the displacement unit can be minimized.

Figure 6:
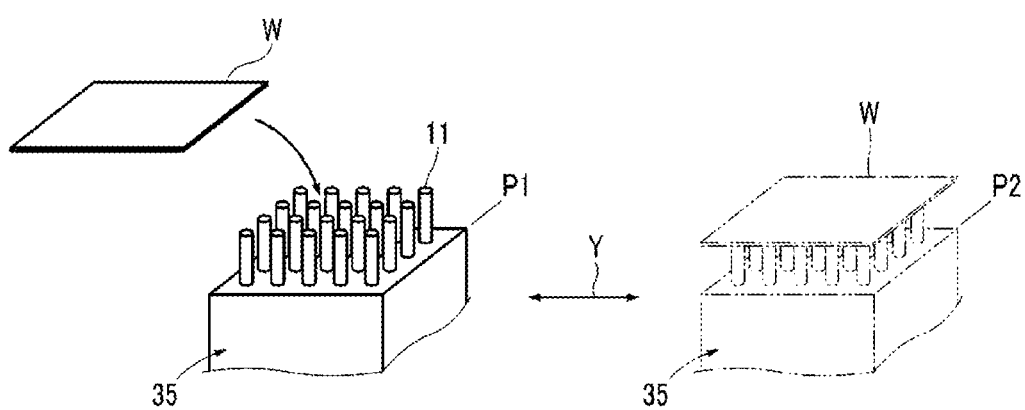
FIG. 6 is a perspective view illustrating on example of the workpiece support apparatus reciprocating along a linear moving path.

The invention is not limited to the above-described embodiment. For example, the workpiece support apparatus 8 is not limited to the conveyor type, and other type can be employed. For example, the moving path of the support member supporting the workpiece W may be positioned on one horizontal surface. Specifically, as illustrated in FIG. 6, a workpiece support apparatus 35 may reciprocate, like an arrow Y, along the linear moving path between a standby position P1, where a flat-shaped workpiece W cut in a rectangular shape is received, and a machining position P2 where the received workpiece W is subjected to the cut machining.

In this embodiment, the displacement unit for displacing the support member 11 to the first holding position or the second holding position consists of the slope member 26, the lock release mechanism 27, and the movement restricting member 28, but the support member 11 may be selectively displaced by an electromagnet, instead of the displacement unit.

As the fixing unit for fixing the support member 11 displaced to the first holding position or the second holding position, an electromagnet may be employed, instead of one (see FIG. 2(a)) consisting of the large-diameter portion 16a, the ball plunger 18, and the diameter-increased portion 23, or the other (see FIG. 2(c)) employing the support portion 20 of the support member 11 and its weight.

The support member 11 set in the state illustrated in FIG. 2(b), in which the lock state is released, is displaced to the second holding position by its weight, but the support member may be displaced to the second holding position by a force of, for example, a spring.

In this embodiment, when each support member 11 is selectively switched to the holding position, all support members 11 are displaced to the first holding position by the slope surface of the slope member 26, and then the required support member 11 only is displaced to the second holding position by the swing surface 34 of the lock release mechanism 27. However, the selective switching of the holding position may be performed as follows, instead of the above way.

That is, (1) all support members 11 may be displaced to the second holding position by the given slope surface, and then the required support member 11 only may be displaced to the first holding position by the desired swing surface. Also, (2) the slope member 26 may be omitted, and a given swing surface may be employed, instead of the lock release mechanism 27. Each support member 11 may be separately displaced from the first holding position to the second holding position, or from the second holding position to the first holding position by the swing surface, if necessary.

Also, (3) the displacement from the second holding position to the first holding position may be performed by a centrifugal force generated when the support member 11 moves the downstream semicircular portion along a circumference of the pulley 14b till the state before the lock state illustrated in FIG. 2(b). After that, the required support member 11 only may be pressed by the given swing surface to be displaced to the first holding position, thereby achieving the lock state illustrated in FIG. 2(a).

In this instance, the support member 11 positioned at the second holding position may be unintentionally displaced to the first holding position beyond the state before the lock state illustrated in FIG. 2(b), so that the support member is in the lock state. This situation may happen by a phenomenon in which the centrifugal force to displace the support member 11 to the first holding position exceeds the force of the ball plunger 18 to block the displacement.

In order to prevent the above situation, the slope surface of the slope member 26 may be provided as a slope surface which is slightly contracted toward the center of the pulley 14b. In this way, since the support member 11 is gradually displaced to the front of the first holding position by cooperation between the slope surface and the centrifugal force, it is possible to avoid the support member from being unintentionally shifted to the lock state.

The selective switching of the holding position may be performed by combining possible portions of the above-described (1) to (3) in accordance with the position of the support member 11 in the direction X (see FIG. 1).

In this embodiment, when the support member 11 which is released from the lock state by the lock release mechanism 27 arrives at the upper end portion of the movement restricting member 28, the support member falls by its weight, and then is moved to the second holding position. However, the fall may not occur due to that the support member 11 is caught by the holding portion 16 or the like. In order to prevent this problem, a forceful fall mechanism for letting the support member 11 to forcefully fall may be provided.

As the forceful fall mechanism, for example, a press unit for further pressing the flange portion 22 of the support member 11, which is released from the lock state, in the downward direction may be provided. Such a press unit may press the flange portion 22 using the swing surface, similar to the lock release mechanism 27 in FIGS. 4(a) and 4(b).

In accordance with an embodiment, a workpiece support apparatus 8 may include: a plurality of support members 11 configured to support a workpiece W from a bottom surface of the workpiece at a machining position in which a cut machining is performed; a moving unit 100 configured to move each support member 11 along a moving path to the machining position while the support member 11 is held at a first holding position in which the workpiece W is supported or a second holding position which is spaced apart from the first holding position; a displacement unit 200 configured to displace at least one support member 11 from the first holding position to the second holding position or from the second holding position to the first holding position along a machining trajectory, before the support member 11 arrives at the machining position whenever each support member 11 is moved to the machining position; and a fixing unit 300 configured to fix the support member 11 which is displaced to the first holding position or the second holding position, at the first holding position or the second holding position.

According to this structure, switching of the holding positions performed along the machining trajectory whenever each support member passes through the machining position is carried out by displacing and fixing the support member at the first holding position or the second holding position before the support member arrives at the machining position. Herein, the term 'before the support member arrives at the machining position' means, for example, a time when the support member stands by at a given standby position or the support member is moving to the machining position.

Accordingly, compared as a case where the support member is stopped at the machining position and then the support member is displaced to switch the holding position, like the related art, it is possible to shorten a cycle time required for the cut machining of the workpiece.

The displacement unit 200 may include a contact surface 201 which is positioned at an angle on the moving path, adapted to come into contact with each support member 11 moving on the moving path, and applies a component of a force to the support member 11 in a direction in which the support member 11 is displaced to the first holding position or the second holding position.

In this way, before the support member arrives at the machining position, the support member can be displaced to the first holding position or the second holding position by use of power to move the support member along the moving path. As a result, it is possible to displace the support member, without providing a separate power source.

The moving unit 100 may move each support member 11 on the moving path while holding each support member 11 to form a plurality of rows of support members 11 along the moving path. The fixing unit 300 may fix the support members 11 at the first holding position while allowing the support members 11 to displace to the first holding position or from the first holding position in accordance with a force or its direction applied to the support members 11. The contact surface 201 may include a slope surface 26 provided on the moving path and inclined toward the moving path, and a plurality of swing surfaces 34 each provided for every row of the support members 11 at a rear side of the slope surface 26 along the moving path. The slope surface 26 may come into contact with one of the support members 11 which is not fixed at the first holding position and is moving on the moving path so that the slope surface 26 displaces said one of support members 11 to the first holding position and said one of the support members 11 is fixed at the first holding position by the fixing unit 300. Each swing surface 34 may be individually controlled based on the machining trajectory so that the swing surface 34 is positioned at a first swing position or is swung to a second swing position. Each swing surface 34 may pass the support member 11 in a state in which the support member 11 is fixed at the first holding position when the swing surface 34 is positioned at the first swing position. Each swing surface 34 may come into contact with the support member 11 of the corresponding row to displace the support member 11 to the second holding position, when the swing surface 34 is swung to the second swing position, so that the support member 11 is released from a state in which the support member 11 is fixed to the first holding position to a state in which the support member 11 is moved to the second holding position by its weight.

Therefore, the holding positions of the support member can be switched with a simple configuration using the power to move the support member along the moving path, without hindrance.

What is claimed is:

1. A workpiece support apparatus comprising:
   a plurality of support members configured to support a workpiece from a bottom surface of the workpiece at a machining position in which a cut machining is performed;
   a moving unit configured to move each support member along a moving path to the machining position while the support member is held at a first holding position in which the workpiece is supported or a second holding position which is spaced apart from the first holding position;
   a displacement unit configured to displace at least one support member from the first holding position to the second holding position or from the second holding position to the first holding position along a machining trajectory, before the support member arrives at the machining position whenever each support member is moved to the machining position; and
   a fixing unit configured to fix the support member which is displaced to the first holding position or the second holding position, at the first holding position or the second holding position.

2. The workpiece support apparatus according to claim 1, wherein the displacement unit includes a contact surface which is positioned at an angle on the moving path, adapted to come into contact with each support member moving on the moving path, and applies a component of a force to the support member in a direction in which the support member is displaced to the first holding position or the second holding position.

3. The workpiece support apparatus according to claim 2, wherein the moving unit moves each support member on the moving path while holding each support member to form a plurality of rows of support members along the moving path,
   wherein the fixing unit fixes the support members at the first holding position while allowing the support members to displace to the first holding position or from the first holding position in accordance with a force or its direction applied to the support members,
   wherein the contact surface includes a slope surface provided on the moving path and inclined toward the moving path, and a plurality of swing surfaces each provided for every row of the support members at a rear side of the slope surface along the moving path,
   wherein the slope surface comes into contact with one of the support members which is not fixed at the first holding position and is moving on the moving path so that the slope surface displaces said one of support members to the first holding position and said one of the support members is fixed at the first holding position by the fixing unit,
   wherein each swing surface is individually controlled based on the machining trajectory so that the swing surface is positioned at a first swing position or is swung to a second swing position,
   wherein each swing surface passes the support member in a state in which the support member is fixed at the first holding position when the swing surface is positioned at the first swing position, and
   wherein each swing surface comes into contact with the support member of the corresponding row to displace the support member to the second holding position, when the swing surface is swung to the second swing position, so that the support member is released from a state in which the support member is fixed to the first holding position to a state in which the support member is moved to the second holding position by its weight.

* * * * *